(12) United States Patent
Valle

(10) Patent No.: US 9,850,992 B2
(45) Date of Patent: *Dec. 26, 2017

(54) MOTION TRANSMISSION SYSTEM OF A BICYCLE

(75) Inventor: Maurizio Valle, Vicenza (IT)

(73) Assignee: Campagnolo S.r.l., Vicenza (IT)

( * ) Notice: Subject to any disclaimer, the term of this patent is extended or adjusted under 35 U.S.C. 154(b) by 0 days.

This patent is subject to a terminal disclaimer.

(21) Appl. No.: 13/279,834

(22) Filed: Oct. 24, 2011

(65) Prior Publication Data
US 2012/0277045 A1 Nov. 1, 2012

Related U.S. Application Data

(62) Division of application No. 12/187,560, filed on Aug. 7, 2008.

(30) Foreign Application Priority Data

Aug. 9, 2007 (IT) .............................. MI2007A1660

(51) Int. Cl.
*F16H 9/06* (2006.01)
*B62M 9/10* (2006.01)
(Continued)

(52) U.S. Cl.
CPC ................ *F16H 9/06* (2013.01); *B62M 9/10* (2013.01); *B62M 9/12* (2013.01); *F16G 13/06* (2013.01)

(58) Field of Classification Search
USPC ............... 474/69, 78, 152–160, 164; 301/59, 301/110.5, 124.2
See application file for complete search history.

(56) References Cited

U.S. PATENT DOCUMENTS 3,082,637 A 3/1963 Paxton
4,121,474 A 10/1978 Arregui Suinaga
(Continued)

FOREIGN PATENT DOCUMENTS

DE 4401272 3/1995
DE 29623258 U1 3/1998
(Continued)

OTHER PUBLICATIONS

Japanese Office Action for Application No. 2008-205210 dated Oct. 16, 2012 (with English translation).
(Continued)

*Primary Examiner* — Sang Kim
*Assistant Examiner* — Juan Campos, Jr.
(74) *Attorney, Agent, or Firm* — Volpe and Koenig, P.C.

(57) ABSTRACT

A sprocket assembly defining a sprocket assembly width. The assembly has at least eleven sprockets and the sprocket assembly mounts to a bicycle freewheel hub that rotates about a rotation axis which defines a predetermined axial distance on the hub between a plane that is substantially perpendicular to the rotation axis. At least one point of the attachment seats for spokes closest to the freewheel body and a plane is substantially perpendicular to the rotation axis and defined in the fastening portion to the frame. The sprocket assembly width is lower than or equal to the predetermined axial distance. A chain that engages the sprockets has a maximum thickness in the direction of the rotation axis between and including 4.6 mm and 5.8 mm.

23 Claims, 5 Drawing Sheets

Figure 1:
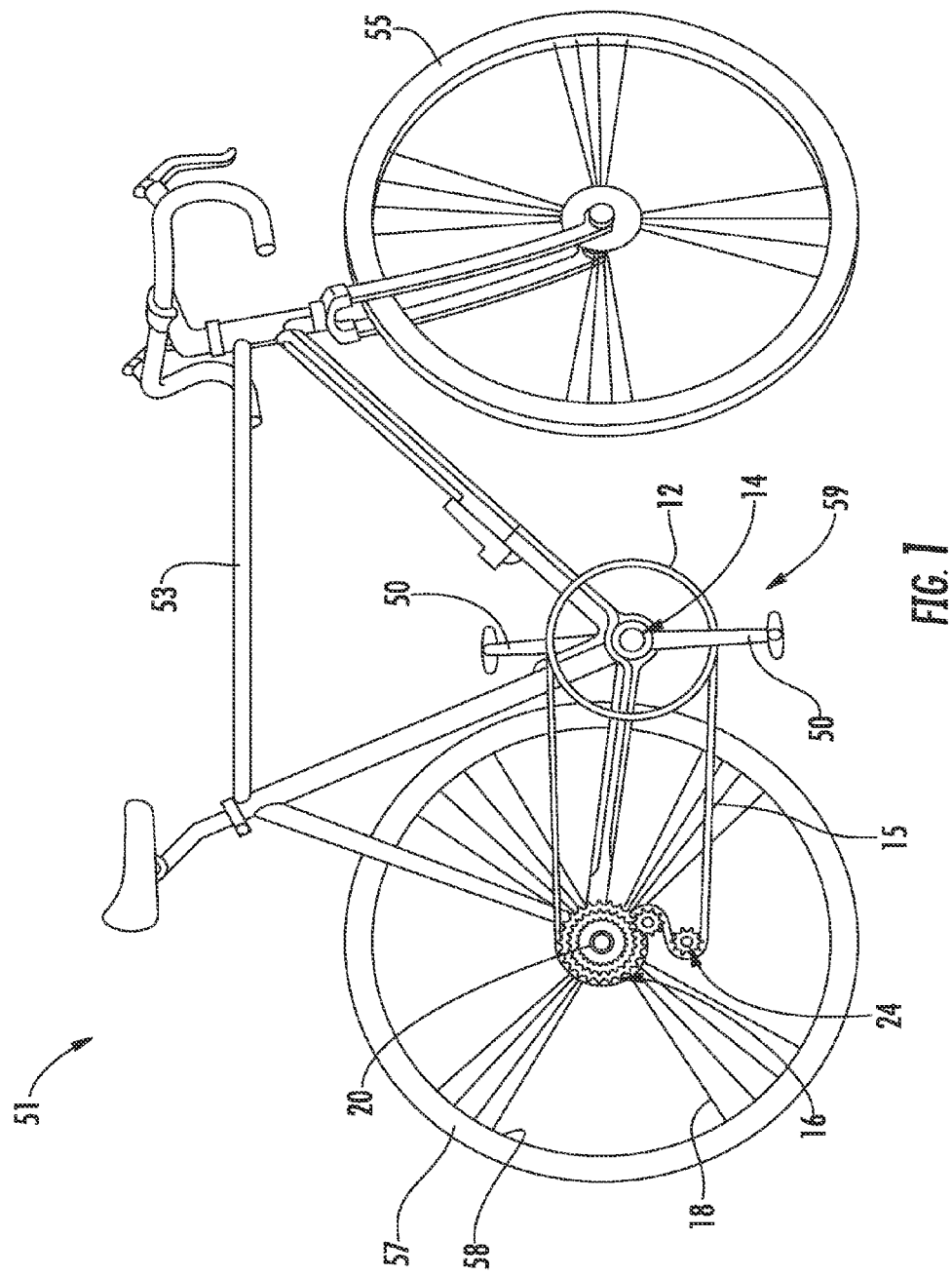

(51) Int. Cl.
B62M 9/12 (2006.01)
F16G 13/06 (2006.01)

(56) References Cited

U.S. PATENT DOCUMENTS

| | | | |
|---|---|---|---|
| 4,363,580 A | 12/1982 | Bell | |
| 5,026,329 A | 6/1991 | Diekevers | |
| 5,205,794 A | 4/1993 | Browning | |
| 5,322,482 A | 6/1994 | Wang | |
| 5,362,278 A | 11/1994 | Bergles et al. | |
| 5,409,422 A | 4/1995 | Feng et al. | |
| 5,569,107 A | 10/1996 | Mu | |
| 5,766,106 A | 6/1998 | Edwards | |
| 5,935,034 A | 8/1999 | Campagnolo | |
| 5,954,604 A * | 9/1999 | Nakamura | 474/160 |
| 6,039,665 A | 3/2000 | Nakamura | |
| 6,102,281 A | 8/2000 | Lafferty et al. | |
| 6,176,798 B1 | 1/2001 | Nakamura | |
| 6,340,338 B1 | 1/2002 | Kamada | |
| 6,382,381 B1 | 5/2002 | Okajima et al. | |
| 6,428,437 B1 | 8/2002 | Schlanger | |
| 6,537,173 B2 | 3/2003 | Mercat et al. | |
| 6,676,549 B1 | 1/2004 | Fukuda | |
| 7,325,391 B1 | 2/2008 | Oishi et al. | |
| 7,344,463 B2 | 3/2008 | Reiter | |
| 7,854,673 B2 | 12/2010 | Oseto et al. | |
| 7,871,347 B2 | 1/2011 | Kamada | |
| 7,931,553 B2 | 4/2011 | Tokuyama | |
| 8,057,338 B2 | 11/2011 | Komada | |
| 2004/0043855 A1 | 3/2004 | Wei | |
| 2004/0121867 A1 | 6/2004 | Reiter | |
| 2004/0142782 A1 | 7/2004 | Kamada | |
| 2005/0266949 A1 | 12/2005 | Kamada | |
| 2005/0272546 A1 | 12/2005 | Reiter | |
| 2006/0063624 A1 | 3/2006 | Voss | |
| 2006/0172840 A1 | 8/2006 | Kamada | |
| 2006/0231366 A1 | 10/2006 | Meggiolan | |
| 2006/0258499 A1 * | 11/2006 | Kamada | 474/160 |
| 2007/0129193 A1 | 6/2007 | Nonoshita et al. | |
| 2007/0200423 A1 | 8/2007 | Kanehisa | |
| 2008/0004143 A1 | 1/2008 | Kanehisa et al. | |
| 2008/0058144 A1 | 3/2008 | Osteo | |
| 2008/0188336 A1 | 8/2008 | Tokuyama | |
| 2009/0042680 A1 | 2/2009 | Valle | |
| 2009/0042681 A1 | 2/2009 | Dal Pra' et al. | |
| 2009/0042682 A1 | 2/2009 | Dal Pra' et al. | |
| 2009/0098966 A1 | 4/2009 | Kamada | |
| 2010/0009794 A1 | 1/2010 | Chiang | |
| 2011/0092327 A1 | 4/2011 | Oishi | |
| 2013/0130852 A1 * | 5/2013 | Valle | B62M 9/10 474/78 |

FOREIGN PATENT DOCUMENTS

| | | |
|---|---|---|
| DE | 202004019270 | 4/2005 |
| DE | 102007010456 | 12/2007 |
| DE | 19629602 A1 | 4/2012 |
| EP | 0012568 | 6/1980 |
| EP | 0510371 A1 | 10/1992 |
| EP | 0561380 A1 | 9/1993 |
| EP | 0765802 | 4/1997 |
| EP | 1043221 | 10/2000 |
| EP | 1422134 A2 | 5/2004 |
| EP | 1431172 | 6/2004 |
| EP | 1688345 | 8/2006 |
| EP | 1721823 A2 | 11/2006 |
| EP | 2022713 | 2/2009 |
| FR | 910359 | 6/1946 |
| FR | 989114 | 9/1951 |
| JP | 2000-177673 A | 6/2000 |
| JP | 2002308177 A | 10/2002 |
| JP | 2004090914 A | 3/2004 |
| JP | 2004224335 A | 8/2004 |
| JP | 2005231556 A | 9/2005 |
| JP | 2005343254 A | 12/2005 |
| TW | 467841 B | 12/2001 |
| TW | 503913 U | 9/2002 |
| TW | 593060 B | 6/2004 |
| TW | M274314 U | 9/2005 |
| TW | I256937 B | 6/2006 |
| WO | 2005080186 A1 | 9/2005 |

OTHER PUBLICATIONS

European Search Report, Appl. No. EP 08005991.8, dated Mar. 6, 2009.
European Search Report, Appl. No. EP 08005988.4, dated Mar. 3, 2009.
European Search Report, Appl. No. EP 08005988.4, dated Jul. 24, 2009.
European Search Report, Appln. No. EP 08005989.2-1254 / 2022713, dated Mar. 28, 2012.
Chinese Office Action and English translation dated Jan. 18, 2012.
English translation of Taiwanese Office Action and Search Report for Application No. 097129115 dated Oct. 7, 2013.
Taiwanese Office Action and Search Report for Taiwanese Application No. 103118653 (English translation only) dated Apr. 26, 2016.
Chinese Office Action for Chinese Application No. 201510089972.7, dated Oct. 18, 2016.

* cited by examiner

MOTION TRANSMISSION SYSTEM OF A BICYCLE

CROSS REFERENCE TO RELATED APPLICATION(S)

This application is a divisional of U.S. patent application Ser. No. 12/187,560, filed on Aug. 7, 2008, which is incorporated by reference as if fully set forth.

FIELD OF INVENTION

The field of the invention relates to a motion transmission system of a bicycle.

BACKGROUND

In a bicycle transmission system, the combination of a guide toothed wheel with a small diameter with a sprocket with a large diameter allows demanding climbs to be easily handled. However, this same combination, over flat land or going downhill, is disadvantageous since the cyclist's energy is dissipated, due to the fact that the cyclist is obliged to pedal quickly while the bicycle moves forwards slowly.

In order to make the aforementioned combination more suitable for the route to be made, it is known to equip the bicycle with a plurality of guide toothed wheels and with a plurality of sprockets, which can be combined with each other based upon requirements, through appropriate gear-shifting devices.

Because bicycle components have reached a high degree of standardization, the characteristic size of components such as frame, gearshifting devices, freewheel body or chain do not greatly vary, so that most bicycles use three guide toothed wheels and up to ten sprockets.

However, certain bicycle transmission systems show a sprocket assembly comprising more sprockets, the largest of which are arranged partially over the spokes of the wheel of the bicycle. The sprockets have a minimum thickness, in the area of engagement with the chain, equal to 1.76 mm, whereas the distance between adjacent sprockets is lower than the minimum thickness of the sprockets themselves, and in particular is equal to 1.66 mm. In order to be made to rotate, the sprocket assembly illustrated requires the use of a special-shaped chain. The aforementioned chain comprises, in alternating succession, a first link, consisting of two plates that are parallel and spaced apart to define the area of engagement with a tooth of a sprocket, and a second link, consisting of a single plate shaped like a "bridge" so as to define in a central portion thereof a seat for coupling with the next tooth of the sprocket.

The aforementioned chain, thanks to the second link made with a single plate, has a maximum thickness much smaller than a conventional chain and for this reason it can also be used when there is a space between the sprockets that is smaller than the thickness of the sprockets themselves.

The aforementioned chain wears down quickly because of the continuous friction between the teeth of the sprockets and the second links consisting of a single shaped plate. This makes it subject to premature structural yielding.

Further, in such an arrangement, the sprockets that are arranged over the spokes of the wheel have a large diameter, i.e. they have a very high number of teeth. Since the number of teeth of the smallest sprocket of known sprocket assemblies is now standardized and goes up to about 11-12 teeth, it follows that passing from the smallest sprockets to the largest ones there is a non-linear increase in diameters, and therefore in the number of teeth. In other words, the cyclist notices a great difference in effort necessary to pedaling from one sprocket to an adjacent sprocket that has a great difference in teeth compared to the previous one. Therefore, it is possible that the cyclist is not able to find the optimum combination of sprockets and guide toothed wheels even with such a large number of sprockets.

In addition to the above, the total bulk of the sprocket assembly is very high at the bicycle wheel, for which reason the chain, when engaging the end sprockets, is inclined with respect to the guide toothed wheels and therefore more subject to friction, wear and tension peaks.

SUMMARY

Throughout the present description and in the subsequent claims, the expression "motion transmission system" in a bicycle is used to indicate the assembly of at least some of the components active in the transmission of motion, imparted by the cyclist through pedaling, from the crank arms to the rear wheel of the bicycle.

The present invention relates, in a first aspect thereof, to a motion transmission system of a bicycle, comprising a sprocket assembly adapted to be mounted on a freewheel body of a hub of a bicycle rear wheel and a bicycle chain adapted to engage the sprockets of the sprocket assembly, the sprocket assembly comprising at least eleven sprockets, the hub being able to rotate about a rotation axis and comprising a plurality of attachment seats of the spokes of the rear wheel of the bicycle and a fastening portion to a frame of the bicycle, a predetermined axial distance being defined on the hub between a plane, substantially perpendicular to the rotation axis, comprising the points of the spoke attachment seats closest to the freewheel body and a plane, substantially perpendicular to the rotation axis and defined in the fastening portion to the frame, comprising the attachment points to the frame closest to the freewheel body, wherein all of the sprockets of the sprocket assembly, when they are associated with the freewheel body, have an overall axial width or bulk smaller than, or equal to, the predetermined axial distance, and in that the chain has a maximum thickness in the direction of the rotation axis comprised between 4.6 mm and 5.8 mm, the extreme values being included.

BRIEF DESCRIPTION OF THE DRAWING(S)

Figure 2:
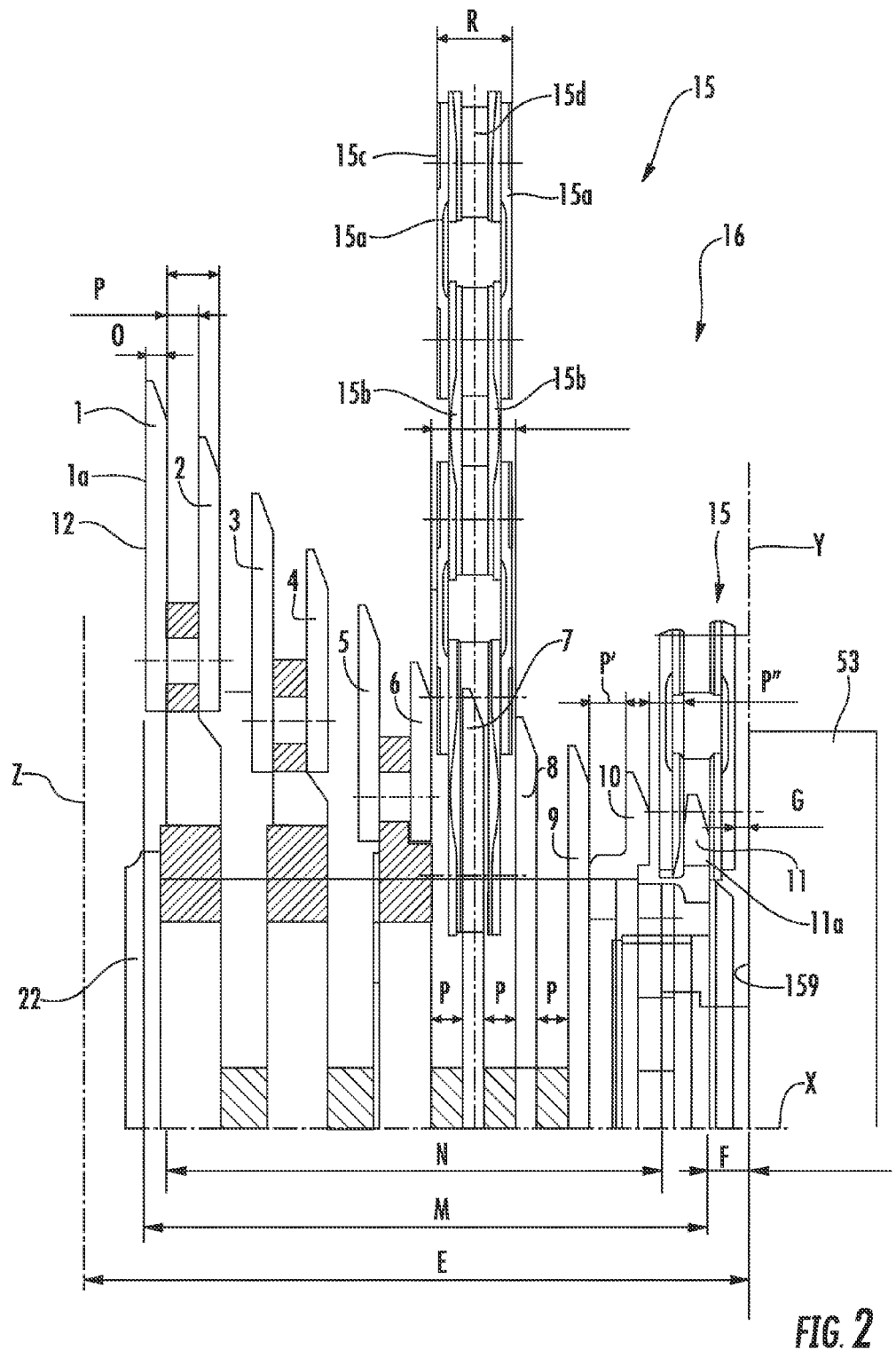
Figure 3:
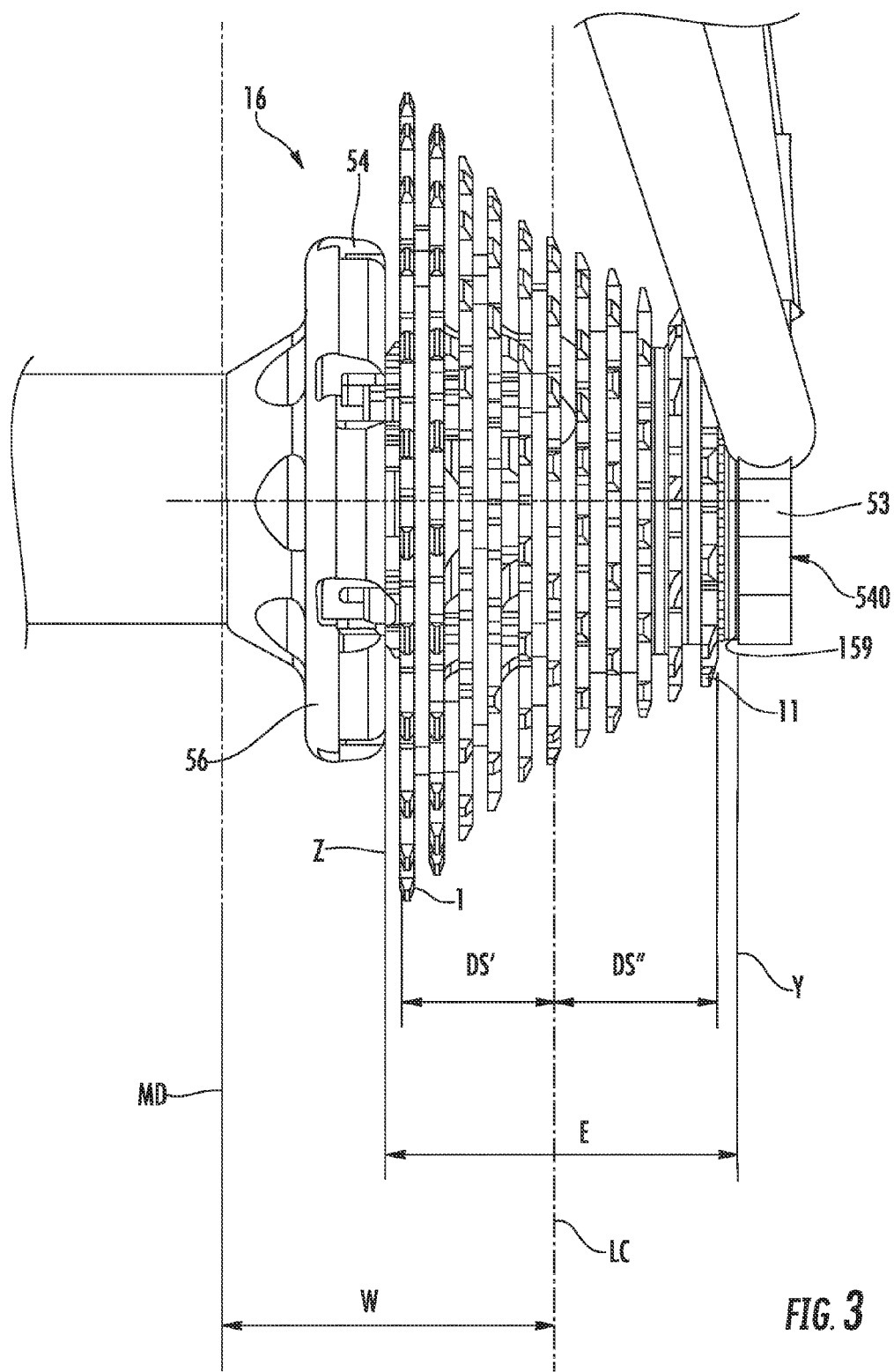
Figure 4:
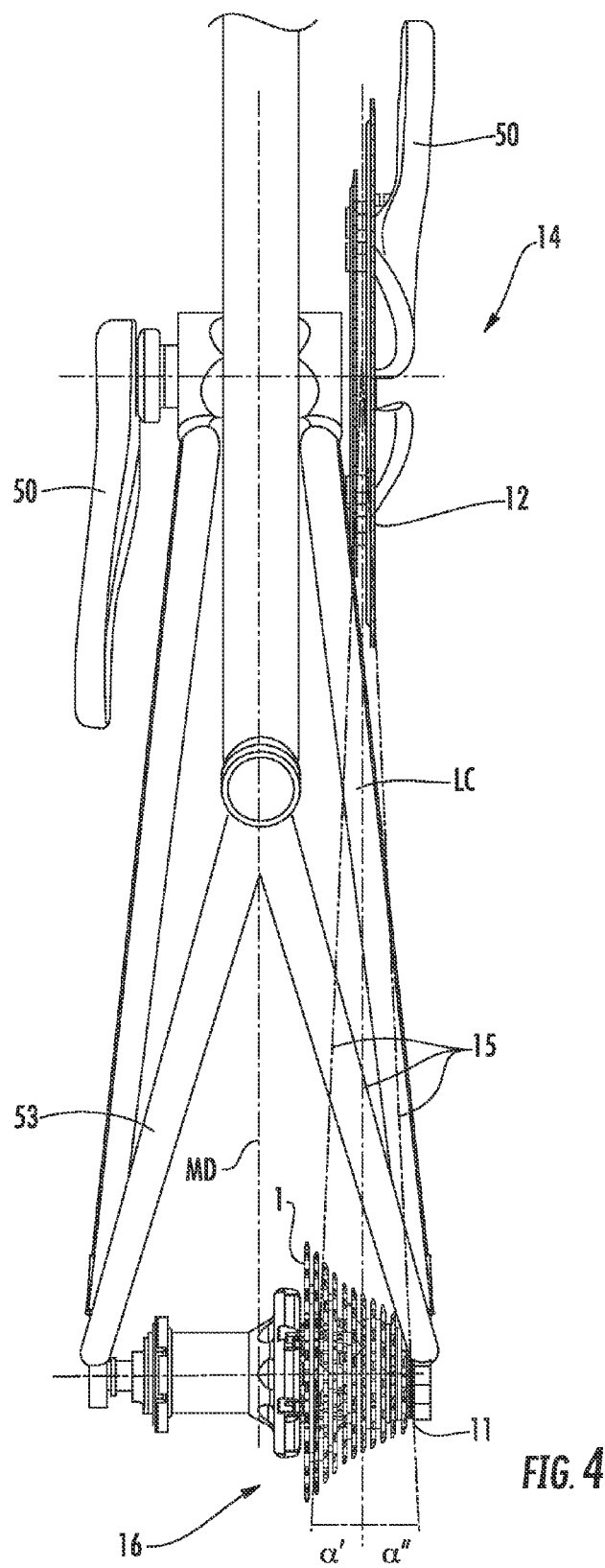
Figure 5:
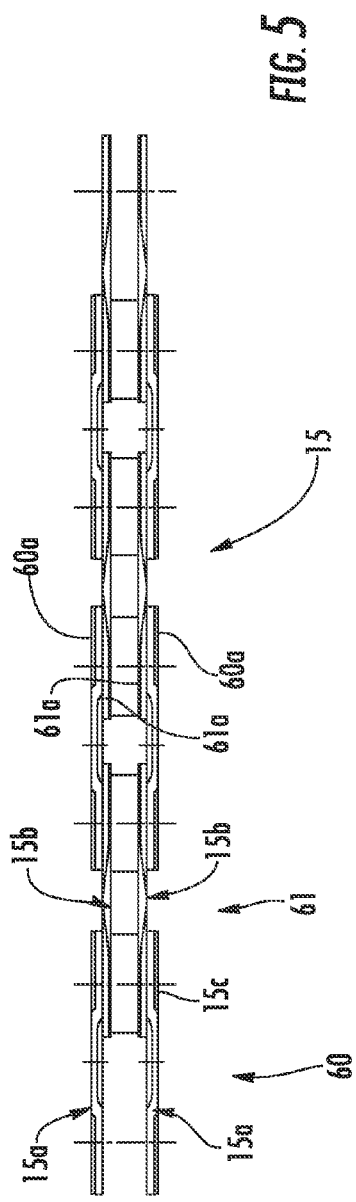
Figure 6:
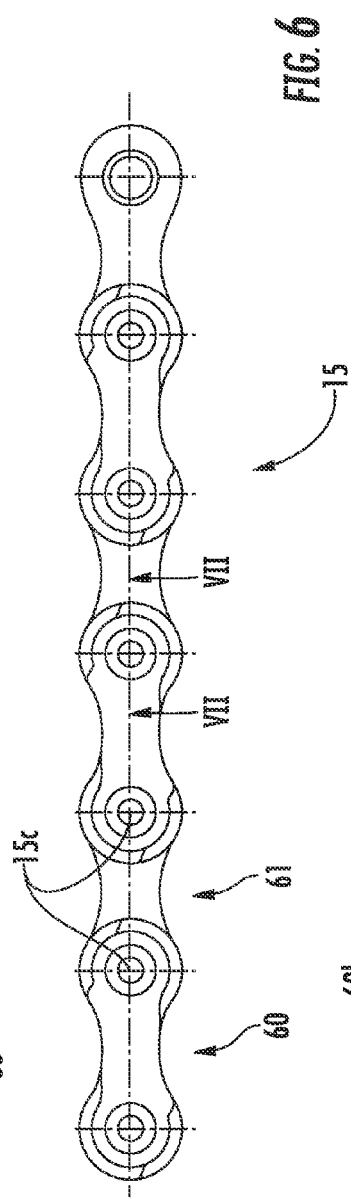
Figure 7:
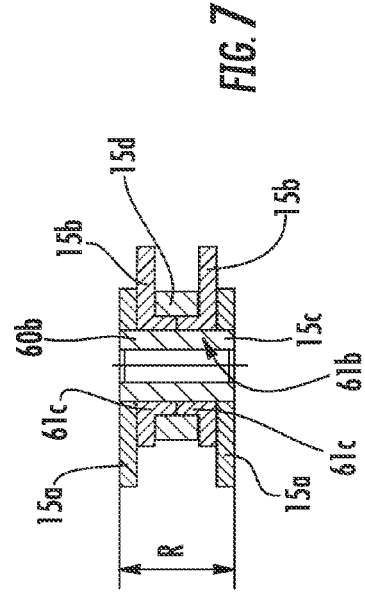

Certain characteristics and advantages shall become clearer from the following detailed description of a preferred embodiment thereof, made with reference to the attached drawings and given for indicating and not limiting purposes. In such drawings:

FIG. 1 schematically shows a side view of a bicycle comprising a motion transmission system;

FIG. 2 schematically shows a longitudinal section view of a portion of the motion transmission system of FIG. 1, i.e. of a sprocket assembly mounted on a freewheel body of a hub of a bicycle rear wheel, such a sprocket assembly being engaged with a bicycle chain;

FIG. 3 schematically shows a plan view from above of the sprocket assembly of FIG. 2 mounted in a bicycle frame;

FIG. 4 schematically shows a plan view from above of a complete transmission system according to the present invention mounted on a bicycle frame, FIG. 3 being an enlarged detail of this FIG. 4;

FIGS. 5 and 6 schematically show a plan view from above and, respectively, a top side view of the chain of FIG. 2;

FIG. 7 schematically shows a longitudinal section view of a portion of the chain of FIGS. 5 and 6, taken according to the plane traced with the line VII-VII of FIG. 6.

DETAILED DESCRIPTION OF THE PREFERRED EMBODIMENT(S)

Introduction

The present invention relates, in a first aspect thereof, to a motion transmission system of a bicycle, comprising a sprocket assembly adapted to be mounted on a freewheel body of a hub of a bicycle rear wheel and a bicycle chain adapted to engage the sprockets of the sprocket assembly, the sprocket assembly comprising at least eleven sprockets, the hub being able to rotate about a rotation axis and comprising a plurality of attachment seats of the spokes of the rear wheel of the bicycle and a fastening portion to a frame of the bicycle, a predetermined axial distance being defined on the hub between a plane, substantially perpendicular to the rotation axis, comprising the points of the spoke attachment seats closest to the freewheel body and a plane, substantially perpendicular to the rotation axis and defined in the fastening portion to the frame, comprising the attachment points to the frame closest to the freewheel body, wherein all of the sprockets of the sprocket assembly, when they are associated with the freewheel body, have an overall axial bulk smaller than, or equal to, the predetermined axial distance, and in that the chain has a maximum thickness in the direction of the rotation axis comprised between 4.6 mm and 5.8 mm, the extreme values being included.

The use of a sprocket assembly having the aforementioned axial bulk and of a chain having the aforementioned thickness allows, on the one hand, a high strength of the transmission system with at least eleven sprockets to be ensured, at the same time allowing conventionally-shaped chain and sprockets to be used, to the advantage of the simplicity of construction and reliability of the transmission system. In particular, the chain is smaller in size than the chains currently used for sprocket assemblies with ten sprockets, so as to allow narrower sprockets and/or smaller distances between conventional sprockets to be used, which results in a lightweight assembly.

More specifically, although the maximum thickness of the chain is less than that currently used for a chain of a sprocket assembly with ten sprockets, the aforementioned thickness of the chain ensures a surprisingly high strength, and in particular it is possible to use a conventionally-shaped chain, which is sufficiently strong, contrary to certain prior art that suggests using a specially-shaped chain. In addition thereto, conventional chains, thanks to the presence of a bush able to rotate freely in the link engaged by a tooth, ensure that the friction between the tooth and the chain does not limit the smooth running of the transmission system.

Moreover, the transmission system described herein provided for the use of a sprocket assembly in which no sprocket is intended to be arranged over the spokes of the wheel of the bicycle, for which reason the sprockets added after the tenth one can advantageously be intermediate sprockets, and not end sprockets with a large diameter as required in the prior art. This enormously increases the linearity of the increase in diameter of the sprockets, since it is possible for example to have a greater number of adjacent sprockets with a difference in teeth equal to just one tooth.

Moreover, the use of a sprocket assembly having an axial bulk such as to be able to be entirely housed on the freewheel body of the hub without being arranged over the spokes of the wheel allows such a sprocket assembly to be suitably positioned, for which reason it can be ensured that the chain, when engaging the end sprockets, is not excessively inclined, thus limiting its wear and the generation of tension peaks.

The chain may comprise an alternating succession of outer links and inner links, connected each other at respective connection ends, each link, outer and inner, comprising two respective plates, outer and inner, being arranged parallel and spaced apart to define a space for receiving a tooth of a sprocket. The shape of the chain of the transmission system may be conventional, which contributes to the simplicity and cost-effectiveness of manufacturing the transmission system.

The maximum thickness may be between 4.8 mm and 5.6 mm, the extreme values being included. Preferably, the maximum thickness is comprised between 5 mm and 5.5 mm, the extreme values being included. These aforementioned maximum thicknesses of the chain ensure a sufficiently high reliability.

Preferably, the axial width or bulk is lower than or equal to 46 mm, and more preferably lower than or equal to 43.5 mm.

In this way, the aforementioned sprocket assembly can be housed in a conventional bicycle having wheels and frame of standardized size.

The distance between two end sprockets of the sprocket assembly, measured between respective faces of the end sprockets facing outwardly from the sprocket assembly, may be lower than or equal to 42.5 mm, and preferably lower than or equal to 40.5 mm.

In this way the chain can engage the sprocket with the smallest diameter with sufficient margin as not to slide in the frame of the bicycle, and the gearshift can position the chain on the sprocket with the largest diameter without interfering with the spokes of the wheel.

The sprockets may have a predetermined position and are spaced apart.

In another embodiment of the transmission system, the sprocket with the smallest diameter of the sprocket assembly has 11 or 12 teeth and the sprocket with the largest diameter has a number of teeth comprised between 23 and 27.

The transmission system has a sprocket assembly comprising a combination of eleven sprockets selected from the following:
 a first combination with sprockets having 11, 12, 13, 14, 15, 16, 17, 18, 19, 21, 23 teeth respectively;
 a second combination with sprockets having 11, 12, 13, 14, 15, 16, 17, 19, 21, 23, 25 teeth respectively;
 a third combination with sprockets having 11, 12, 13, 14, 15, 17, 19, 21, 23, 25, 27 teeth respectively;
 a fourth combination with sprockets having 12, 13, 14, 15, 16, 17, 18, 19, 21, 23, 25 teeth respectively;
 a fifth combination with sprockets having 12, 13, 14, 15, 16, 17, 19, 21, 23, 25, 27 teeth respectively.

In another alternative, the transmission system has a sprocket assembly comprising a combination of twelve sprockets selected from the following:
 a first combination with sprockets having 11, 12, 13, 14, 15, 16, 17, 18, 19, 20, 21, 23 teeth respectively;
 a second combination with sprockets having 11, 12, 13, 14, 15, 16, 17, 18, 19, 21, 23, 25 teeth respectively;
 a third combination with sprockets having 11, 12, 13, 14, 15, 17, 18, 19, 21, 23, 25, 27 teeth respectively;
 a fourth combination with sprockets having 12, 13, 14, 15, 16, 17, 18, 19, 20, 21, 23, 25 teeth respectively;

a fifth combination with sprockets having 12, 13, 14, 15, 16, 17, 18, 19, 21, 23, 25, 27 teeth respectively.

The sprockets may have a maximum thickness, at an engagement area with the chain, lower than or equal to 1.7 mm, and more preferably lower than or equal to 1.6 mm.

The distance between at least two consecutive sprockets of the sprocket assembly, measured between the engagement area with the chain of the sprocket with the smallest diameter and an adjacent sprocket, is greater than or equal to the thickness of the sprockets. Moreover, the distance between all of the consecutive sprockets of the sprocket assembly may be greater than or equal to the thickness of the sprockets.

The distance between consecutive sprockets may be lower than or equal to 2.2 mm.

This makes it possible to use a chain with plates of the links having relatively large thicknesses and thus being sufficiently strong.

The sprockets with a smaller diameter may be placed at greater distances apart than the sprockets with a larger diameter. Further, the sprockets with a smaller diameter may be at a distance apart lower than or equal to 2.5 mm.

Such distances between sprockets allow the passage of a conventionally-shaped chain with particularly strong sections.

At least six consecutive sprockets may have a number of teeth that differs by one from that of at least one adjacent sprocket. Moreover, one of the at least six sprockets has eighteen teeth.

Moreover, the consecutive sprockets may be at least seven in number. Even further, the consecutive sprockets may have at least eight or at least nine in number.

In this way, in the movement of the chain from one sprocket to another the cyclist does not notice a great difference in effort.

The transmission system may comprise at least one guide toothed wheel associated with at least one crank arm and adapted to be engaged by the chain at the same time as one of the sprockets of the sprocket assembly. The at least one toothed wheel may be made from aluminum alloy and has a maximum thickness, in the engagement area of the chain, lower than or equal to 1.7 mm. Further, the maximum thickness of the at least one toothed wheel and of the sprockets, in the respective engagement areas of the chain, is the same. In particular, the maximum thickness may be lower than or equal to 1.6 mm in combination with a chain having a thickness lower than or equal to 5.5 mm.

Thanks to the dimensions indicated above it is possible to make toothed wheels that are light and sufficiently strong.

In a second aspect thereof, the sprocket assembly for a bicycle rear wheel comprises at least eleven sprockets, wherein all of the sprockets of the sprocket assembly have an overall axial width or bulk lower than or equal to 46 mm.

Such a sprocket assembly may have, individually or in combination, all of the structural and functional characteristics discussed above with reference to the sprocket assembly of the motion transmission system and therefore has all of the aforementioned advantages.

In particular, the axial bulk of the sprocket assembly is preferably lower than or equal to 43.5 mm.

The distance between two end sprockets of the sprocket assembly, may be measured between respective faces of the end sprockets facing outwardly from the sprocket assembly, is lower than or equal to 42.5 mm, and more preferably lower than or equal to 40.5 mm.

The sprockets may have a predetermined position and are spaced apart.

In another embodiment of the sprocket assembly, the sprocket with the smallest diameter has 11 or 12 teeth and the sprocket with the largest diameter has a number of teeth comprised between 23 and 27.

The aforementioned sprocket assembly may comprise a combination of eleven sprockets selected from the following:
 a first combination with sprockets having 11, 12, 13, 14, 15, 16, 17, 18, 19, 21, 23 teeth respectively;
 a second combination with sprockets having 11, 12, 13, 14, 15, 16, 17, 19, 21, 23, 25 teeth respectively;
 a third combination with sprockets having 11, 12, 13, 14, 15, 17, 19, 21, 23, 25, 27 teeth respectively;
 a fourth combination with sprockets having 12, 13, 14, 15, 16, 17, 18, 19, 21, 23, 25 teeth respectively;
 a fifth combination with sprockets having 12, 13, 14, 15, 16, 17, 19, 21, 23, 25, 27 teeth respectively.

In another alternative, the sprocket assembly may comprise a combination of twelve sprockets selected from the following:
 a first combination with sprockets having 11, 12, 13, 14, 15, 16, 17, 18, 19, 20, 21, 23 teeth respectively;
 a second combination with sprockets having 11, 12, 13, 14, 15, 16, 17, 18, 19, 21, 23, 25 teeth respectively;
 a third combination with sprockets having 11, 12, 13, 14, 15, 17, 18, 19, 21, 23, 25, 27 teeth respectively;
 a fourth combination with sprockets having 12, 13, 14, 15, 16, 17, 18, 19, 20, 21, 23, 25 teeth respectively;
 a fifth combination with sprockets having 12, 13, 14, 15, 16, 17, 18, 19, 21, 23, 25, 27 teeth respectively.

The sprockets may have a maximum thickness, at an engagement area with a bicycle chain, lower than or equal to 1.7 mm, and more preferably lower than or equal to 1.6 mm.

The distance between at least two consecutive sprockets of the sprocket assembly, measured between the engagement area with a bicycle chain of the sprocket with the smallest diameter and an adjacent sprocket, may be greater than or equal to the thickness of the sprockets.

Moreover, the distance between all of the consecutive sprockets of the sprocket assembly may be greater than or equal to the thickness of the sprockets.

Preferably, the distance between consecutive sprockets is lower than or equal to 2.2 mm.

In another embodiment of the sprocket assembly, the sprockets with a smaller diameter may be placed at greater distances apart than the sprockets with a larger diameter. The sprockets with a smaller diameter may be at a distance apart lower than or equal to 2.5 mm.

At least six consecutive sprockets may have a number of teeth that differs by one from that of at least one adjacent sprocket. Moreover, one of the at least six sprockets preferably has eighteen teeth.

Further, the consecutive sprockets may be at least seven in number. Even further, the consecutive sprockets may be at least eight or at least nine in number.

In a third aspect thereof, the bicycle chain comprises an alternating succession of outer links and inner links, connected each other at respective connection ends, each link, outer and inner, comprising two respective plates, outer and inner, arranged parallel and spaced apart to define a space for receiving a tooth of a sprocket of a sprocket assembly of a bicycle rear wheel, wherein it has a maximum thickness comprised between 4.6 mm and 5.8 mm, the extreme values being included.

Such a bicycle chain has, individually or in combination, all of the structural and functional characteristics discussed above with reference to the chain of the motion transmission system and therefore has all of the aforementioned advantages.

In particular, the maximum thickness is between 4.8 mm and 5.6 mm, the extreme values being included, and more preferably between 5 mm and 5.5 mm, the extreme values being included.

In a fourth aspect thereof, a bicycle comprises a transmission system, and/or a sprocket assembly and/or a chain of the type described above.

Such a bicycle may have, individually or in combination, all of the structural and functional characteristics discussed above with reference to the aforementioned transmission system and/or sprocket assembly and/or chain.

In a fifth aspect thereof, a bicycle comprises a sprocket assembly having at least eleven sprockets, wherein the sprocket assembly is positioned so that the difference between the distance of the sprocket with the smallest diameter from a chain line of the bicycle and the distance of the sprocket with the largest diameter from the chain line is lower than or equal, in absolute value, to 4 mm.

In such a bicycle, when the chain is in the engagement positions of the end sprockets, it is not excessively inclined and it is not subject to wear and tension peaks.

The distance of the sprocket with the smallest diameter from the chain line is equal to the distance of the sprocket with the largest diameter from the chain line.

DESCRIPTION

With initial reference to FIG. 1, a bicycle 51 is shown to which a motion transmission system in accordance with the present invention is applied, wholly indicated with 59.

The bicycle 51 of FIG. 1 comprises a frame 53 to which a front wheel 55 and a rear driving wheel 57 are connected.

What makes the front wheel 55 different from the rear driving wheel 57 is that the second receives the motion from the transmission system 59 of the bicycle 51. This system comprises a pair of crank arms 50 directly coupled with one or more guide toothed wheels 12. The crank arms 50 are supported in rotation in the frame 53 through a bottom bracket assembly 14 comprising a shaft and some bearings. The guide toothed wheels 12 engage a chain 15 to transmit the torque applied by the cyclist on the crank arms 50 to a sprocket assembly 16 coupled with the rear driving wheel 57.

In particular, the rear driving wheel 57 comprises a rim 58, some spokes 18 and a hub 20. The hub 20 is per se known and for this reason is only schematically illustrated: it comprises a first body 56 (FIG. 3) coupled with the rim 58 through the spokes 18 and a second body that rotates as a unit with the sprocket assembly 16. The second body is indicated with reference numeral 22 in FIG. 2 and is known as freewheel body since it is free to rotate with respect to the first body 56 in a direction of rotation, and move it into rotation in the opposite direction. The rotation axis is indicated with X in FIG. 2.

On the first body 56 of the hub 20 there are seats 54 (FIG. 3) for the attachment of the spokes 18 to the hub 20. On the axially opposite side to the seats 54, the hub 20 comprises a portion 540 for attachment to the frame 53 of the bicycle 51.

The sprocket assembly 16 comprises a plurality of driven toothed wheels, known as sprockets, having a different outer diameter to one another: in the example illustrated in FIGS. 2-4, there are eleven sprockets and they are indicated with reference numerals 1 to 11, from the sprocket 1 having the largest outer diameter to the sprocket 11 having the smallest outer diameter.

A gearshifting device 24, illustrated in FIG. 1, allows the chain 15 to be moved from an engagement condition with a sprocket to an engagement condition with another sprocket. A similar device can also be provided in the area of the crank arms 50 in the case in which there is more than one guide toothed wheel 12. In this way the sprockets and the toothed wheels can be associated with each other through the chain 15 in a plurality of combinations.

With reference to FIGS. 2 and 3, the sprocket assembly 16 has a size such as to be able to be entirely housed in the space of the hub 20 between the portion 540 for attachment to the frame 53 of the bicycle 51 and the portion of body 56 where the seats 54 are made. In particular, the sprocket assembly 16 is of a size such as to be able to be housed in the space E between the planes Z and Y, where Z is the plane, perpendicular to the axis X of the hub 20, passing through the points of the seats 54 closest to the freewheel body 22, and Y is the plane, perpendicular to the axis X and defined in the portion for attachment to the frame 53 of the hub, passing through the points of the hub 20 where the attachment to the frame 53 takes place and that are closest to the freewheel body 22.

In particular, the portion of the frame 53 to which the wheel is fastened in general is shaped like a fork with a face facing towards the sprocket assembly 16, indicated with reference numeral 159 in FIGS. 2 and 3 and the points of the hub 20 where the attachment to the frame 53 takes place and that are closest to the freewheel body 22 are defined at a plane defined on the face 159.

The space E has a predetermined axial distance greater than or equal to 46 mm and the sprocket assembly 16 has an axial bulk lower than or equal to 46 mm, preferably lower than or equal to 43.50 mm. Further, the sprocket with the smallest diameter 11 has a distance F from the face 159 of the frame 53 at least equal to 2 mm or such that when the chain 15 engages it the distance G of the chain 15 from the frame 53 is at least equal to 0.5 mm.

Moreover, the distance M between the faces 1a and 11a of the sprockets 1 and 11 facing towards the outside of the sprocket assembly 16 is lower than or equal to 42.5 mm, and preferably lower than or equal to 40.5 mm, compared with an engagement area of the sprockets made on the freewheel body 22 with a length N lower than or equal to 39 mm.

With reference to FIG. 3 it can be seen that thanks to the size of the sprocket assembly 16 it can be positioned substantially symmetrically with respect to the chain line LC of the bicycle 51, conventionally defined by the standardization rules at a predetermined distance W from the middle plane MD of the bicycle 51 (in the case of use of a pair of guide toothed wheels associated with the crank arms, the chain line is arranged substantially at half the distance between the two guide toothed wheels). This means that the face 1a of the sprocket 1 with the largest diameter and the face 11a of the sprocket 11 with the smallest diameter have respective distances DS' and DS" from the chain line LC that are substantially equal or with a difference lower than 4 mm.

This means that when the chain 15 is engaged respectively with the sprocket 1 with the largest diameter and with the sprocket 11 with the smallest diameter it is inclined with respect to the chain line LC by substantially equal acute angles $\alpha'$ and $\alpha''$, as shown in FIG. 4. Preferably, the angles $\alpha'$ and $\alpha''$ are between 2.25° and 3.75°.

The sprocket assembly 16 meets the measurements indicated above since the sprockets from 1 to 11 have a thickness O substantially constant along a radial direction, and lower than or equal to 1.7 mm and, moreover, the distance P between most of the adjacent sprockets is greater than the thickness of the sprockets but lower than or equal to 2.3 mm.

Actually, the thickness of the sprockets could also be variable along a radial direction, but what's more is that in the engagement area with the chain 15 sprockets from 1 to 11 have a maximum thickness lower than or equal to 1.7 mm and preferably lower than or equal to 1.6 mm.

Preferably, moreover, all of the sprockets are placed at a distance P apart lower than or equal to 2.2 mm.

Alternatively, some sprockets are at a distance apart greater than 2.2 mm. According to the preferred embodiment shown in FIG. 2, the sprockets 9, 10 and 11 are at distances apart P' and P'' equal to 2.4 and 2.5 mm.

The chain 15 is illustrated in detail in FIGS. 5 to 7 and has a conventional shape. It comprises an alternating succession of outer links 60 and inner links 61, connected each other at respective connection ends 60a and 61a.

Each outer link comprises two outer plates 15a and each inner link 61 comprises two inner plates 15b. The plates of each link are arranged parallel and spaced apart to define a space for receiving a tooth of a sprocket. The outer plates 15a are farther apart than the inner plates 15b and they partially overlap them at the respective connection end 60a and 61a. A rivet 15c rotatably joins the inner plates 15b to the outer plates 15a at the respective connection ends 60a and 61a.

In particular, the ends 60a of the outer plates 60 have respective holes 60b and the ends 61a of the inner plates 61 have respective holes 61b, the holes 60b and 61b having substantially the same diameter and being aligned to house the rivets 15c. Around the rivet 15c, between the two inner plates 15b, there is a bush 15d capable of rotating freely about the axis of the rivet (FIG. 7). Between the rivet 15c and the bush 15d flanged portions 61c of the inner plates 15b are arranged, located around the holes 61b and extending towards the inside of the link 61.

The maximum thickness R of the chain 15 is lower than or equal to 5.8 mm and preferably lower than or equal to 5.5 mm.

In any case, the chain has a minimum thickness greater than or equal to 4.6 mm, preferably greater than or equal to 4.8 mm and even more preferably greater than or equal to 5 mm. These values ensure sufficient structural strength to satisfy the current technical standards. In the case in which the guide toothed wheels 12 associated with the crank arms 50 are made from aluminum alloy, at least in the part intended to engage the chain 15, the latter preferably has a thickness comprised between 5 and 5.7 mm.

With the sizes indicated above, some combinations of eleven sprockets that can be housed substantially in the space in which the combinations of ten sprockets of the prior art are housed, are the following:
first combination with sprockets having 11, 12, 13, 14, 15, 16, 17, 18, 19, 21, 23 teeth respectively;
second combination with sprockets having 11, 12, 13, 14, 15, 16, 17, 19, 21, 23, 25 teeth respectively;
third combination with sprockets having 11, 12, 13, 14, 15, 17, 19, 21, 23, 25, 27 teeth respectively;
fourth combination with sprockets having 12, 13, 14, 15, 16, 17, 18, 19, 21, 23, 25 teeth respectively;
fifth combination with sprockets having 12, 13, 14, 15, 16, 17, 19, 21, 23, 25, 27 teeth respectively.

Some combinations with twelve sprockets are the following:
first combination with sprockets having 11, 12, 13, 14, 15, 16, 17, 18, 19, 20, 21, 23 teeth respectively;
second combination with sprockets having 11, 12, 13, 14, 15, 16, 17, 18, 19, 21, 23, 25 teeth respectively;
third combination with sprockets having 11, 12, 13, 14, 15, 17, 18, 19, 21, 23, 25, 27 teeth respectively;
fourth combination with sprockets having 12, 13, 14, 15, 16, 17, 18, 19, 20, 21, 23, 25 teeth respectively;
fifth combination with sprockets having 12, 13, 14, 15, 16, 17, 18, 19, 21, 23, 25, 27 teeth respectively.

Of course, a person of ordinary skill in the art can bring numerous modifications and variants to the motion transmission system of a bicycle described above, in order to satisfy contingent and specific requirements, all of which are anyway covered by the scope of protection as defined by the following claims.

What is claimed is:

1. A bicycle freewheel body and sprocket assembly wherein:
the freewheel body has a predetermined axial width, an outer surface that is configured to mate with one or more sprockets of the sprocket assembly, and an internal surface selected to mate with a hub associated with a bicycle rear wheel; and,
the sprocket assembly has eleven sprockets of various diameters that are arranged on the freewheel body with a largest diameter sprocket and a smallest diameter sprocket forming end sprockets of the sprocket assembly, each of the end sprockets has an outer face and the respective outer face of each end sprocket faces in an opposite directions and the outer faces are spaced from each other along the freewheel body predetermined axial width by a distance that is no greater than 42.5 mm;
an assembly of at least eleven sprockets, that has an overall axial width, measured between respective outer faces of end sprockets in the assembly, that is no greater than 40.5 mm; and,
a chain comprised of an alternating succession of inner and outer links, connected to each other at respective connection ends,
each of the links comprising inner and outer plates that are arranged parallel to each other, the two plates of both the outer links and the inner links being spaced apart from each other to define between the two plates a void space that receives at least one tooth of at least one of the sprockets.

2. The bicycle freewheel body and sprocket assembly according to claim 1, wherein at least one tooth of at least one sprocket has a maximum thickness that is no greater than 1.7 mm.

3. The bicycle freewheel body and sprocket assembly according to claim 2, wherein the maximum thickness is no greater than 1.6 mm.

4. The bicycle freewheel body and sprocket assembly according to claim 1, wherein the sprockets vary in size and a distance between teeth of at least two consecutive sprockets of the assembly is at least equal to an average thickness of the sprockets.

5. The bicycle freewheel body and sprocket assembly according to claim 4, wherein the distance between the teeth sprockets of the assembly is at least equal to a thickness of any single sprocket.

6. The bicycle freewheel body and sprocket assembly according to claim 4, wherein the distance between the teeth is no greater than 2.2 mm.

7. The bicycle freewheel body and sprocket assembly according to claim 4, wherein sprockets with the smallest diameter are arranged at greater distances apart than sprockets with the largest diameter.

8. The bicycle freewheel body and sprocket assembly according to claim 7, wherein the sprockets with the smallest diameter are at a distance apart lower than or equal to 2.5 mm.

9. The bicycle freewheel body and sprocket assembly according to claim 1, wherein at least six consecutive sprockets have a number of teeth that differs by one from that of at least one adjacent sprocket.

10. The bicycle freewheel body and sprocket assembly according to claim 9, wherein the consecutive sprockets are at least seven in number.

11. The bicycle freewheel body and sprocket assembly according to claim 10, wherein the consecutive sprockets are at least eight in number.

12. The bicycle freewheel body and sprocket assembly according to claim 11, wherein the consecutive sprockets are at least nine in number.

13. The bicycle freewheel body and sprocket assembly according to claim 9, wherein the at least six consecutive sprockets comprise a sprocket with eighteen teeth.

14. Bicycle comprising a bicycle freewheel body and sprocket assembly according to claim 1.

15. The motion transmission system of claim 1 wherein the smallest diameter sprocket has 11 or 12 teeth and the largest diameter sprocket has 23 to 27 teeth.

16. The motion transmission system of claim 1 wherein the sprocket assembly is comprised of sprockets selected from a group consisting of:
 a first combination with sprockets having 11, 12, 13, 14, 15, 16, 17, 18, 19, 21, 23 teeth respectively;
 a second combination with sprockets having 11, 12, 13, 14, 15, 16, 17, 19, 21, 23, 25 teeth respectively;
 a third combination with sprockets having 11, 12, 13, 14, 15, 17, 19, 21, 23, 25, 27 teeth respectively;
 a fourth combination with sprockets having 12, 13, 14, 15, 16, 17, 18, 19, 21, 23, 25 teeth respectively; and
 a fifth combination with sprockets having 12, 13, 14, 15, 16, 17, 19, 21, 23, 25, 27 teeth respectively.

17. The motion transmission system of claim 1 wherein at least six consecutive sprockets of the sprocket assembly have a number of teeth that differs by one from that of at least one adjacent sprocket.

18. The motion transmission system of claim 1 wherein the consecutive sprockets have a number of sprockets selected from a group of 7 sprockets, 8 sprockets, and 9 sprockets.

19. A bicycle comprising a motion transmission system according to claim 1.

20. A motion transmission system including a sprocket assembly of at least eleven sprockets defining a sprocket assembly width between respective outer faces of end sprockets of the sprocket assembly, wherein the sprocket assembly mounts to a hub that rotates about a rotation axis and a predetermined axial distance being defined on the hub between a first plane, substantially perpendicular to the rotation axis, comprising at least one point of attachment seats for spokes closest to a freewheel body of the hub, and a second plane, substantially perpendicular to the rotation axis and defined at a frame attachment portion,
 wherein the sprocket assembly width is less than, or equal to, the predetermined axial distance, and
 wherein a chain that engages the sprockets has a maximum thickness in a direction of the rotation axis between and including 4.6 mm and 5.8 mm,
 wherein the chain comprises an alternating succession of outer and inner links, connected to each other at respective connection ends, each of the links comprising two respective plates arranged parallel to each other, the two plates of both the outer links and the inner links being spaced apart from each other to define between the two plates a void space that receives a tooth of a sprocket,
 wherein the sprocket assembly width is no greater than 40.5 mm,
 wherein a distance between consecutive sprockets of the sprocket assembly is greater than or equal to a thickness of the sprockets.

21. A motion transmission system including a sprocket assembly of at least eleven sprockets defining a sprocket assembly width defined between respective outer faces of end sprockets of the sprocket assembly, wherein the sprocket assembly mounts to a hub that has a predetermined axial distance defined on the hub between a first plane, perpendicular to a rotation axis, comprising at least one point of attachment seats for spokes closest to a freewheel body of the hub, and a second plane, perpendicular to the rotation axis and defined at a frame attachment portion,
 wherein the sprocket assembly width is less than, or equal to, the predetermined axial distance,
 wherein a chain that engages the sprockets has a maximum thickness in a direction of the rotation axis between and including 4.6 mm and 5.8 mm,
 wherein the chain comprises an alternating succession of outer and inner links, connected to each other at respective connection ends, each of the links comprising two respective plates arranged parallel to each other, the two plates of both the outer links and the inner links being spaced apart from each other to define between the two plates a void space that receives a tooth of a sprocket,
 wherein the sprocket assembly width is no greater than 40.5 mm,
 wherein a distance between consecutive sprockets of the sprocket assembly is greater than or equal to a thickness of the sprockets,
 wherein the sprockets have a maximum thickness, at an engagement area with the chain, no greater than 1.7 mm.

22. A motion transmission system including a sprocket assembly of at least eleven sprockets defining a sprocket assembly width defined between respective outer faces of end sprockets of the sprocket assembly, wherein the sprocket assembly mounts to a hub that rotates about a rotation axis and a predetermined axial distance being defined on the hub between a first plane, substantially perpendicular to the rotation axis, comprising at least one point of attachment seats for spokes closest to a freewheel body of the hub, and a second plane, substantially perpendicular to the rotation axis and defined at a frame attachment portion,
 wherein the motion transmission system includes a sprocket engagement chain comprised of alternating outer and inner links, connected to each other at respective connection ends, each of the links comprising two respective plates, arranged parallel to each other, the two plates of both the outer links and the inner links being spaced apart from each other to define between the two plates a void space that receives a tooth associated with an engaged sprocket, wherein the sprocket assembly width is less than, or equal to, the predetermined axial distance, and wherein the sprocket assembly width is no greater than 40.5 mm, wherein at least six consecutive sprockets have a number of teeth that differs by one from that of at least one adjacent sprocket.

23. The motion transmission system of claim 22 wherein the sprocket assembly is comprised of twelve sprockets selected from a group consisting of:

a first combination with sprockets having 11, 12, 13, 14, 15, 16, 17, 18, 19, 20, 21, 23 teeth respectively;

a second combination with sprockets having 11, 12, 13, 14, 15, 16, 17, 18, 19, 21, 23, 25 teeth respectively;

a third combination with sprockets having 11, 12, 13, 14, 15, 17, 18, 19, 21, 23, 25, 27 teeth respectively;

a fourth combination with sprockets having 12, 13, 14, 15, 16, 17, 18, 19, 20, 21, 23, 25 teeth respectively; and a fifth combination with sprockets having 12, 13, 14, 15, 16, 17, 18, 19, 21, 23, 25, 27 teeth respectively.

\* \* \* \* \*